United States Patent
Gohil et al.

(10) Patent No.: US 10,157,122 B1
(45) Date of Patent: Dec. 18, 2018

(54) AUTOMATED GENERATION AND EXECUTION OF COMPUTER SOFTWARE TEST CASES

(71) Applicant: FMR LLC, Boston, MA (US)

(72) Inventors: Yuvrajsinh Bhupatsinh Gohil, Karnataka (IN); Manjunatha G N, Karnataka (IN); Vishal Gaur, Karnataka (IN); Jyothilingham Anand, Tamilnadu (IN); Saranya Alagarsamy, Karnataka (IN); Prashanth Gopi, Karnataka (IN)

(73) Assignee: FMR LLC, Boston, MA (US)

(*) Notice: Subject to any disclaimer, the term of this patent is extended or adjusted under 35 U.S.C. 154(b) by 1 day.

(21) Appl. No.: 15/693,047

(22) Filed: Aug. 31, 2017

(51) Int. Cl.
  *G06F 9/44* (2018.01)
  *G06F 11/36* (2006.01)
  *G06F 9/445* (2018.01)

(52) U.S. Cl.
  CPC ...... *G06F 11/3684* (2013.01); *G06F 11/3688* (2013.01); *G06F 11/3696* (2013.01)

(58) Field of Classification Search
  CPC .............. G06F 11/362; G06F 11/3672; G06F 11/3688; G06F 11/3664; G06F 11/3684
  USPC .......................................... 717/124
  See application file for complete search history.

(56) References Cited

U.S. PATENT DOCUMENTS

| | | | |
|---|---|---|---|
| 8,893,089 B2 | 11/2014 | Rao et al. | |
| 9,047,414 B1 | 6/2015 | Matyjek | |
| 9,117,028 B2 | 8/2015 | Norton et al. | |
| 9,507,698 B2 | 11/2016 | Vikutan et al. | |
| 2005/0188271 A1 | 8/2005 | West et al. | |
| 2007/0128899 A1* | 6/2007 | Mayer | G06F 9/4406 439/152 |
| 2014/0172512 A1 | 6/2014 | Chandra et al. | |
| 2015/0254171 A1 | 9/2015 | Harden et al. | |
| 2016/0217062 A1 | 7/2016 | Singi et al. | |

OTHER PUBLICATIONS

De Santiago Jr., V. A. & Vijaykumar, N. L., "Generating model-based test cases from natural language requirements for space application software," Software Qual. J., Springer Science+Business Media, published Jul. 31, 2011, 67 pages.

(Continued)

*Primary Examiner* — Chuck O Kendall
(74) *Attorney, Agent, or Firm* — Proskauer Rose LLP

(57) ABSTRACT

Methods and apparatuses are described for automated generation and execution of computer software test cases. A digitized voice segment is captured that corresponds to speech submitted by a user of a remote device. A software automation test case is generated using one or more phrases extracted from the digitized voice segment. The software automation test case is executed against a plurality of browser-based software applications using a plurality of automation testing tools, including converting the software automation test case into a plurality of tool-and-browser specific test cases, each based upon test case requirements of a selected automation testing tool and test case requirements of a selected browser-based application. An automation execution report is generated based upon the execution of each of the plurality of tool-and-browser specific test cases.

29 Claims, 4 Drawing Sheets

(56) References Cited

OTHER PUBLICATIONS

Morgan, Charles P. et al., "ATCG: An Automated Test Case Generator," Journal of Information Technology Management, vol. XXVII, No. 3, 2016, pp. 112-120.

Tummalapenta, Suresh et al., "Automating Test Automation," ICSE 2012, Zurich, Switzerland, 2012, pp. 881-891.

Singi, Kapil et al. "Generation of Relevant Test Conditions from Natural Language Software Requirements," Software Testing Conference, 2013, 15 pages.

George, N. & Selvakumar, J., "Model Based Test Case Generation from Natural Language Requirements and Inconsistency, Incompleteness Detection in Natural Language using Model-Checking Approach," International Journal of Advanced Research in Computer Engineering & Technology (IJARCET), vol. 2, Issue 4, Apr. 2013, pp. 1565-1573.

Masuda, Satoshi et al., "Automatic Generation of Test Cases using Document Analysis Techniques," International Journal of New Technology and Research (IJNTR), vol. 2, Issue 7, Jul. 2016, pp. 59-64.

\* cited by examiner

| TestCaseName | Browser | Status | Automation Execution Report Description | Time Stamp | Detailed Report |
|---|---|---|---|---|---|
| CTG_Wisdom_Demo_001_SAH | chrome | Pass | Scenario Successfully executed | 19-May-2017 14:05:29 | Click Here |

FIG. 4

AUTOMATED GENERATION AND EXECUTION OF COMPUTER SOFTWARE TEST CASES

TECHNICAL FIELD

This application relates generally to methods and apparatuses, including computer program products, for automated generation and execution of computer software test cases.

BACKGROUND

Current software testing processes typically require a functional testing team to design manual test cases based upon, e.g., requirements present in a system design specification (SDS) and the manual test cases are then converted into automation scripts by automation engineers. Today's computing devices, such as PCs, tablets, and smartphones, are available in a wide variety of hardware and software platforms each having different operational requirements and form factors. Most of these devices provide browser-based software to enable users to connect to the internet and access various applications. Today's applications typically require the same test cases to be performed across multiple platforms and layouts, where each application often has slight variations in terms of appearance and function when executed on each device due to elements like screen size, user interface design, hardware profile, and so forth. As a result, the ability for application developers to quickly and efficiently test such browser-based applications across the spectrum of devices, platforms, and layouts—without much (if any) manual tester involvement—has become important.

In addition, there is an increased reliance on automation testing tools to execute test cases against the spectrum of browser-based applications and platforms. However, these automation testing tools are typically limited to executing test cases written in a specific language or customized for a certain type of browser-based application. Generalized test cases cannot be easily and efficiently translated into tool-specific test cases that can be automatically executed against a variety of browser applications.

Furthermore, in traditional testing frameworks, there is a dichotomy between a group of test engineers (TEs)—who know the browser application thoroughly and how to optimally test the application—and software programmers or developers that have experience writing test case code in programming languages (e.g., Java, C++). As a result, TEs must rely on software programmers to craft test cases for execution. As a result, the test scripts generated by the software programmers are generally not optimized for thoroughly testing the browser application and such test scripts are not easily adaptable or modifiable for changing testing scenarios or requirements across multiple platforms.

SUMMARY

Therefore, what is needed are methods and systems for automatically generating and executing tool-specific test cases applicable to a range of browser-based applications based upon a generalized software automation test case that is seamlessly created using voice input. This is an automated process of capturing a test engineer's voice input and converting it into automated test cases. The techniques described herein include complex computerized natural language processing and interpretation, for example to identify certain words and convert them into similar programmatic commands based upon context; e.g., the words "Go" and "Navigate" should be similarly understood to relate to a URL. Current methods of writing test cases require increased redundancy of test cases, as test engineers interpret requirements documents in varying degrees and different ways, and convert the requirements into a range of test cases. The techniques described herein reduce the redundancy while still providing complete and accurate test cases to ensure comprehensive test coverage.

The invention, in one aspect, features a system for automated generation and execution of computer software test cases. The system comprises a server computing device that captures a digitized voice segment from a remote device, the first digitized voice segment corresponding to speech submitted by a user of the remote device. The server computing device generates a software automation test case using one or more phrases extracted from the digitized voice segment. The server computing device executes the software automation test case against a plurality of browser-based software applications using a plurality of automation testing tools, comprising: selecting one or more of the automation testing tools to execute the software automation test case, selecting one or more of the plurality of browser-based software applications against which to execute the software automation test case, converting the software automation test case into a plurality of tool-and-browser specific test executions, each based upon test case requirements of a selected automation testing tool and test case requirements of a selected browser-based application, and executing the plurality of tool-and-browser specific test executions. The server computing device generates an automation execution report based upon the execution of each of the plurality of tool-and-browser specific test executions.

The invention, in another aspect, features a method of automated generation and execution of computer software test cases. A server computing device captures a digitized voice segment from a remote device, the first digitized voice segment corresponding to speech submitted by a user of the remote device. The server computing device generates a software automation test case using one or more phrases extracted from the digitized voice segment. The server computing device executes the software automation test case against a plurality of browser-based software applications using a plurality of automation testing tools, comprising: selecting one or more of the automation testing tools to execute the software automation test case, selecting one or more of the plurality of browser-based software applications against which to execute the software automation test case, converting the software automation test case into a plurality of tool-and-browser specific test executions, each based upon test case requirements of a selected automation testing tool and test case requirements of a selected browser-based application, and executing the plurality of tool-and-browser specific test executions. The server computing device generates an automation execution report based upon the execution of each of the plurality of tool-and-browser specific test executions.

The invention, in another aspect, features a computer program product, tangibly embodied in a non-transitory computer readable storage device, for automated generation and execution of computer software test cases. The computer program product includes instructions that, when executed, cause a server computing device to capture a digitized voice segment from a remote device, the first digitized voice segment corresponding to speech submitted by a user of the remote device. The computer program product includes instructions that, when executed, cause the server computing device to generate a software automation test case using one or more phrases extracted from the digitized voice segment. The computer program product includes instructions that, when executed, cause the server computing device to execute the software automation test case against a plurality of browser-based software applications using a plurality of automation testing tools, comprising: selecting one or more of the automation testing tools to execute the software automation test case, selecting one or more of the plurality of browser-based software applications against which to execute the software automation test case, converting the software automation test case into a plurality of tool-and-browser specific test executions, each based upon test case requirements of a selected automation testing tool and test case requirements of a selected browser-based application, and executing the plurality of tool-and-browser specific test executions. The computer program product includes instructions that, when executed, cause the server computing device to generate an automation execution report based upon the execution of each of the plurality of tool-and-browser specific test executions.

Any of the above aspects can include one or more of the following features. In some embodiments, the server computing device receives, from a client computing device, a text file comprising a manual test case; imports one or more data elements from the text file into a database; populates a set of test case pairs using the imported data elements; and generates a software automation test case using the populated set of test case pairs. In some embodiments, extracting one or more phrases from the digitized voice segment comprises converting one or more waveforms in the digitized voice segment into a corresponding number of text-based phrases. In some embodiments, the server computing device aggregates the text-based phrases into a sequence of test actions and compiles the sequence of test actions to form the software automation test case.

In some embodiments, each of the automation testing tools is located on a separate computing device from the server computing device. In some embodiments, each of the browser-based software application is located on a separate computing device from the server computing device.

In some embodiments, executing the plurality of tool-and-browser specific test executions comprises, for each tool-and-browser specific test execution: transmitting, by the server computing device, a tool-specific test case to the computing device of the automation testing tool associated with the tool-and-browser specific test execution; establishing, by the computing device of the automation testing tool, a connection to the computing device of the browser-based software application associated with the tool-and-browser specific test execution; executing, by the computing device of the automation testing tool, the tool-specific test case against the browser-based software application; and transmitting, by the computing device of the automation testing tool, test results associated with the tool-and-browser specific test execution to the server computing device.

In some embodiments, the server computing device collects the test results for each of the tool-and-browser specific test executions to generate the automation execution report. In some embodiments, the automation execution report identifies a test case name, a browser type, a test status, a test description, and one or more test errors for each tool-and-browser specific test execution. In some embodiments, the automation execution report identifies one or more test steps in the tool-and-browser specific test execution that are associated with the one or more test errors.

In some embodiments, converting the software automation test case into a plurality of tool-and-browser specific test executions comprises: identifying test case requirements associated with each of the browser-based software applications; identifying test case requirements associated with each of the automation testing tools; and for each combination of an automation testing tool and a browser-based software application: generating a tool-and-browser specific test execution based upon the software automation test case, the test case requirements associated with the automation testing tool, and the test case requirements associated with the browser-based software application.

In some embodiments, generating a tool-and-browser specific test execution comprises extracting one or more data elements from the software automation test case and mapping each of the extracted data elements to a corresponding data element in a format recognizable by the automation testing tool based upon the test case requirements associated with the automation testing tool. In some embodiments, generating a tool-and-browser specific test execution comprises configuring one or more of the mapped data elements based upon the test case requirements associated with the browser-based software application. In some embodiments, at least a portion of the plurality of browser-based applications comprises one or more different layouts for a single browser software platform.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is an exemplary automation execution report.

DETAILED DESCRIPTION

Figure 1:
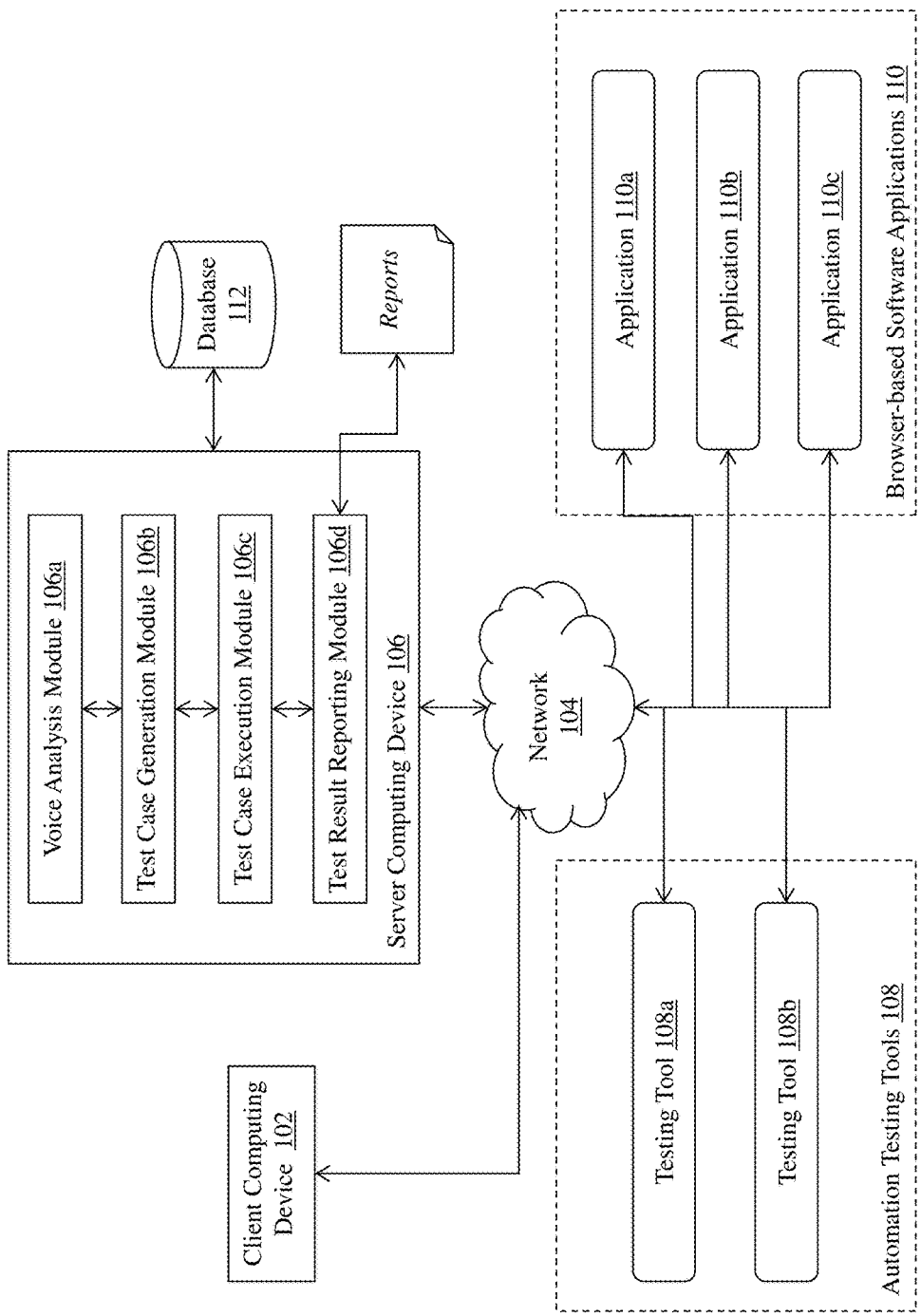
FIG. 1 is a block diagram of a system for automated generation and execution of computer software test cases.

FIG. 1 is a block diagram of a system 100 for automated generation and execution of computer software test cases. The system 100 includes a client computing device 102, a communications network 104, and a server computing device 106 with several computing modules, including a voice analysis module 106a, a test case generation module 106b, a test case execution module 106c, and a test result reporting module 106d. The system 100 also includes a plurality of automation testing tools 108—including testing tool 108a and testing tool 108b, and a plurality of browser-based software applications 110—including application 110a, application 110b, and application 110c. The system 100 also includes a database 112 coupled to the server computing device 106.

The client computing device 102 connects to the communications network 104 in order to communicate with the server computing device 106 to provide input and receive output relating to the process of automated generation and execution of computer software test cases as described herein. In some embodiments, the client computing device 102 can be coupled to a display device for, e.g., providing a detailed graphical user interface (GUI) that receives input for and presents output resulting from the methods and systems described herein.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communications network 104 enables the other components of the system 100 to communicate with each other in order to perform the process of automated generation and execution of computer software test cases as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware and software modules that includes specialized hardware and/or software modules that execute on a processor and interact with memory modules of the server computing device 106 to perform functions for automated generation and execution of computer software test cases as described herein. The server computing device 106 includes a voice analysis module 106a, a test case generation module 106b, a test case execution module 106c, and a test result reporting module 106d (as mentioned above) that execute on and/or interact with the processor of the server computing device 106.

In some embodiments, the voice analysis module 106a, the test case generation module 106b, the test case execution module 106c, and the test result reporting module 106d are specialized sets of computer software instructions programmed onto one or more dedicated processors in the server computing device 106 and can include specifically-designated memory locations and/or registers for executing the specialized computer software instructions. Although the modules 106a-106d are shown in FIG. 1 as executing within the same server computing device 106, in some embodiments the functionality of the modules 106a-106d can be distributed among a plurality of server computing devices. As shown in FIG. 1, the server computing device 106 enables the modules 106a-106d communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a-106d is described in detail below.

The automation testing tools 108a and 108b (collectively, 108) are software applications, implemented on any of a number of operating system platforms (e.g., OS X, Windows, Linux), that are configured to automatically execute test cases against target software applications—such as browser-based applications 110. Exemplary automation testing tools include, but are not limited, to Selenium (available from http://www.seleniumhq.com) and Sahi (available from http://sahipro.com). The automation testing tools 108 are programmed to receive test cases that are either written in a programming language that is specific to the automation testing tool (e.g., Selenese for Selenium) and/or the tools 108 can be configured with an application programming interface (API) that receives test case instructions in another programming language (e.g., Java, C#, Ruby, Python, JavaScript, and the like) and converts the received instructions into tool-specific instructions. To execute the test cases, the computing devices that host the automation testing tools 108 establish a connection to the computing devices that host each of the browser-based software applications 110 and, using the connection, execute test case instructions to cause the browser-based applications 110 to perform actions in the browser software (e.g., interacting with user interface (UI) and other elements in the applications 110—such as clicking a link, selecting an option, providing text input, retrieving data from pages, and so forth). The tools 108 can capture and otherwise receive data resulting from execution of the test cases from the applications 110.

As mentioned above, the browser-based software applications 110a, 110b, 110c (collectively, 110) are operated using browser software located on computing devices. Exemplary browser software includes, but is not limited to, Mozilla Firefox™ available from Mozilla Corp., Google Chrome™ available from Google Inc., Safari available from Apple Inc., and Microsoft Edge™ available from Microsoft Corp. The applications 110 can comprise browser software installed on a computing device that is launched upon receipt of a particular Uniform Resource Identifier (URI), such as a web address or URL. In some embodiments, the browser-based applications 110a-110c are directed to a URI that references functionality on the server computing device 108 (e.g., a web server configured to serve a web-based application). The applications 110 communicate with the automation testing tools 108 in order to execute functionality according to test case instructions received from the tools 108.

The database 112 is a computing device (or in some embodiments, a set of computing devices) coupled to the server computing device 106 and is configured to receive, generate, and store specific segments of data relating to the process of automated generation and execution of computer software test cases as described herein. In some embodiments, all or a portion of the database 112 can be integrated with the server computing device 106 or be located on a separate computing device or devices. The database 112 can comprise one or more databases configured to store portions of data used by the other components of the system 100, as will be described in greater detail below. An exemplary database 112 is MySQL™ available from Oracle Corp. of Redwood City, Calif.

Figure 2:
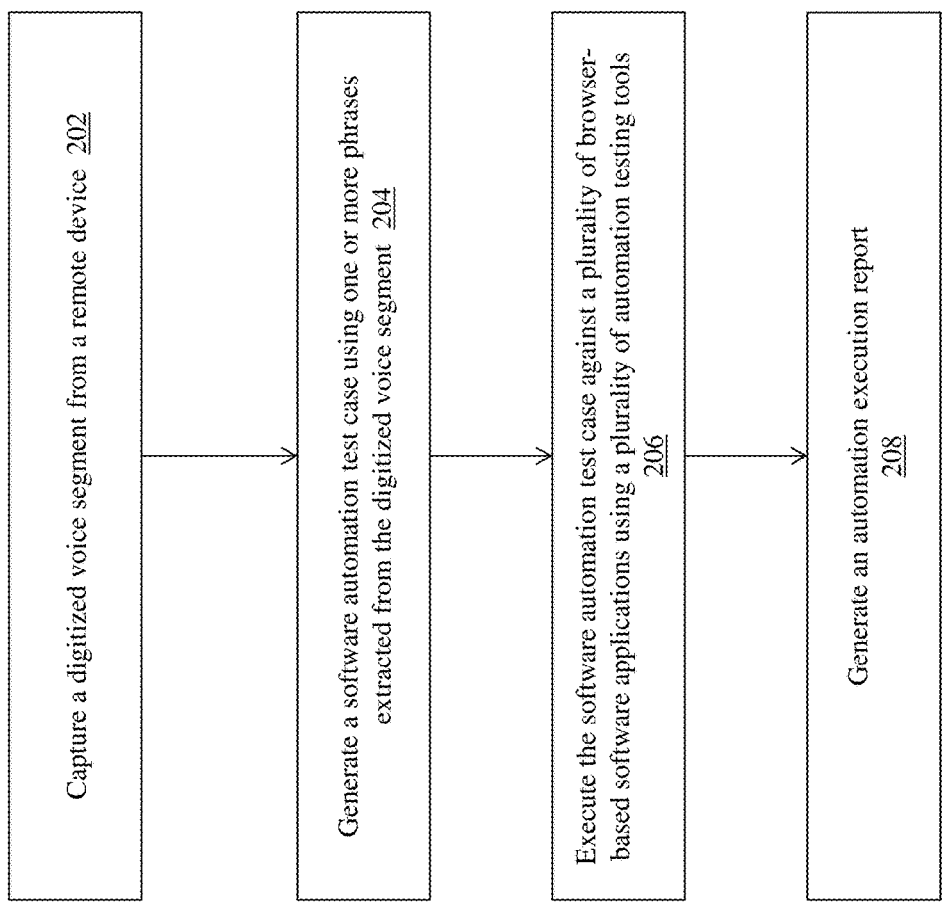
FIG. 2 is a flow diagram of a method of automated generation and execution of computer software test cases.

FIG. 2 is a flow diagram of a method 200 of automated generation and execution of computer software test cases, using the system 100 of FIG. 1. The voice analysis module 106a captures (202) a digitized voice segment from a remote device (e.g., client computing device 102). The digitized voice segment corresponds to speech submitted by a user of client device 102. For example, a user at client device 102 may be a software engineer, a QA analyst, or other similar person whose task is to create test cases for execution by the automation testing tools 108 against the browser-based software applications 110. Instead of requiring the user to manually code test cases into the system, the user can verbally provide the elements and/or steps of each test case to be generated via a microphone coupled to the client device 102. In this way, the user does not need to understand any specific programming languages that are customarily used to write test cases; instead, the user can simply provide, e.g., plain-English test commands and test steps that the system 100 converts into actionable, automation tool-specific test cases that are executed to test the intended application functionality. The client device 102 digitizes the user's speech into an electronic voice segment (e.g., one or more digital audio files, a digital audio stream, and the like) and transmits the digitized voice segment to the voice analysis module 106a of server computing device 106.

The voice analysis module 106a analyzes the digitized voice segment to extract words and phrases from the segment. For example, the voice analysis module 106a can analyze the waveform of the audio contained in the digitized voice segment and automatically map sections of the waveform to, e.g., a database of waveforms of known words and phrases in order to identify the particular words/phrases contained in the segment. In some embodiments, the voice analysis module 106a leverages a voice-to-text API, such as the Google Cloud Speech API (available from Google Inc.), to recognize the words and phrases in the digitized voice segment. Also, it should be appreciated that the voice analysis module 106a is capable of digitizing the voice segments, in the case that the segments are captured or otherwise received in non-digital form. The voice analysis module 106a can also perform functions to improve the audio quality of the digitized voice segments, such as adjusting compression, converting the segments to another format, reducing or eliminating background noise, and so forth.

The test case generation module 106b receives the extracted words and phrases from the voice analysis module 106a, and the module 106b generates (204) a software automation test case using one or more of the extracted phrases. In some embodiments, the module 106b creates a test case file (e.g., containing test steps, instructions, and related metadata) based upon the extracted phrases. For example, the module 106b can generate a text file that contains the extracted phrases in a particular sequence corresponding to the order in which the test steps are to be carried out. In some embodiments, the module 106b uses one or more of the extracted words and phrases to retrieve additional test case instructions from, e.g., database 112. For example, if the digitized voice segment contains the phrase "Login Routine," the test case generation module 106b can search a test instruction repository in database 112 and retrieve a sequence of test case steps (e.g., 1) Navigate to Login Page; 2) Enter Login Credentials; 3) Click Login Button) relating to the phrase, which are then inserted into the software automation test case being generated.

It should be appreciated that, in some embodiments, the test case generation module 106b can receive manual test case instructions from, e.g., client device 102—in addition to the voice recognition input method described above. For example, a user at client device 102 can provide manual test case instructions (e.g., as typed text) and/or a previously prepared text file containing test case instructions to server computing device 106. The test case generation module 106b can import one or more data elements from the input text into database 112, and populate a set of test case pairs using the imported data elements. The test case generation module 106b can then generate one or more software automation test cases using the populated set of test case pairs.

In one embodiment, the test case generation module 106b utilizes a combinatorial algorithm to generate the software automation test cases. For example, based upon the input test case pairs, the test case generation module 106b generates a test case for each possible combination of test steps in the scenario under test—if the scenario has four test steps, the module 106b generates sixteen different test cases in total. In some embodiments, the module 106b generates a template that corresponds to each possible combination of test steps, and the templates are converted to tool-specific test cases as described herein.

An example use case for the test case generation is described below. A requirements document may describe the following test scenario:

1) Navigate to www.anyurl.com;
2) Enter username and password on login page;
3) Click on login button;
4) Verify that interstitial page is displayed.

The module 106b generates a test case and/or template for each combination of the four steps listed above using the combinatorial algorithm.

Figure 3:
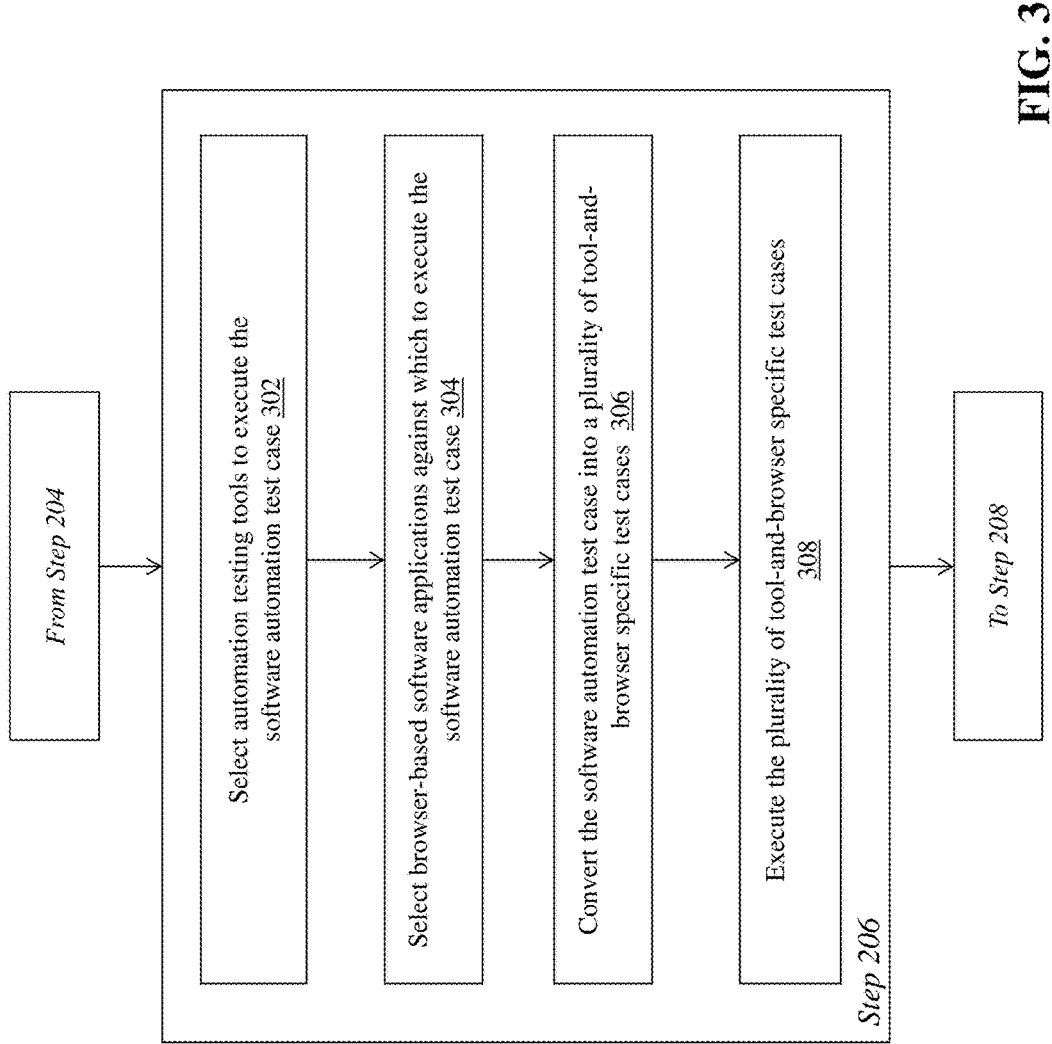
FIG. 3 is a detailed flow diagram of a method of executing a software automation test case against a plurality of browser-based software applications using a plurality of automation testing tools.

Once the test case generation module 106b has generated the test cases, the test case execution module 106c executes (206) at least one of the software automation test cases against the plurality of browser-based software applications 110 using the plurality of automation testing tools 108. FIG. 3 is a detailed flow diagram of a method 300 of executing the software automation test case. The test case execution module 106c analyzes the software automation test case to determine which of the tools 108 and applications 110 will be used to execute the test case. For example, the software automation test case can contain metadata that identifies specific automation tools 108 and/or browser applications 110 to which the test case is applicable—the software test process may require that only a subset of the tools 108 and/or applications 110 is tested. The module 106c uses the metadata to identify which tools 108 and/or applications 110 to select.

In another example, the module 106c determines whether computing device(s) associated with the automation tools 108 and/or the browser applications 110 are configured to execute the test case. For example, the computing device that hosts one of the browser applications (e.g., 110a) may be offline for maintenance or to deploy an updated application build. In this case, the module 106c would not select that specific application 110a for test execution until the computing device is back online. It should be appreciated that other methods for selecting which automation testing tools 108 and browser-based software applications 110 can be used without departing from the scope of invention.

Based upon the above-described analysis, the test case execution module 106c selects (302) one or more of the automation testing tools 108 to execute the software automation test case and also selects (304) one or more of the browser-based software applications 110 against which to execute the software automation test case. In some embodiments, the module 106c generates a combination testing matrix for each of the selected automation testing tools 108 and each of the browser-based software applications 110 to be tested. For example, if the available testing tools 108 are Selenium and Sahi, and the available applications 110 are Chrome, Firefox, and Edge, the module 106c generates a combination testing matrix comprised of:

| Tool | Application |
|---|---|
| Selenium | Chrome |
| Selenium | Firefox |
| Selenium | Edge |
| Sahi | Chrome |
| Sahi | Firefox |
| Sahi | Edge |

As shown above, the matrix contains each combination of testing tool 108 and browser application 110. It should be appreciated that, in some cases, a combination of testing tool and browser application may be incompatible (e.g., Selenium only works on Firefox, etc.) or not configured to operate together by an administrator of the system 100. In those cases, the matrix does not contain the corresponding tool-application combinations.

Using the matrix, the test case execution module 106c converts (306) the software automation test case into a plurality of tool-specific test cases—i.e., one specific test case for each tool, which is then executable on multiple different browsers. With the above matrix as an example, the module 106c would implement six different tool-and-browser specific test executions. The module 106c can convert the software automation test case into the tool-specific test cases using a variety of techniques, including but not limited to: APIs configured for each of the automation testing tools 108 that map input parameters (e.g., from the test case) into actionable test steps that are recognized by the corresponding testing tool; processes that convert the test case into a specialized programming language compatible with the specific automation testing tool (e.g., Selenese), and the like.

In one embodiment, the test case execution module 106c uses a keyword-driven approach to generating the tool-specific test cases. For example, each test case can include steps and actions, where each step is associated with a corresponding action. Examples of actions include Navigate, ClickOnButton, VerifyTest, and so forth. Each action acts as a keyword that the module 106c uses to determine an appropriate tool-specific function at runtime.

In some embodiments, the test case execution module 106c identifies test case requirements associated with each of the browser-based software applications 110 (e.g., by querying database 112) and uses the test case requirements to generate the tool-and-browser specific test executions. For example, the Firefox browser may require a specific sequence of actions to complete a task properly (which can be different from other browsers); otherwise the Firefox browser will not respond and/or send back an error that prevents completion of the test case. When generating the tool-specific test cases for the Firefox browser, the test case execution module 106c can coordinate the test steps such that the specific sequence of actions is properly set forth in the test case. In some embodiments, the module 106c performs the requirements process as part of a validation step for previously-generated test cases. The module 106c can identify similar test case requirements associated with each of the automation testing tools 108 and use those test case requirements when generating the tool-and-browser specific test executions.

Once the tool-specific test cases are generated, the test case execution module 106c executes (308) these test cases against the applicable browser-based software applications 110 using the applicable automation testing tools 108. In one embodiment, the module 106c transmits the tool-specific test case to the computing device of the automation testing tool (e.g., 108a) associated with the test case. For example, if the specific test case is configured to run on the Selenium platform, the module 106c transmits the test case to the computing device for tool 108a.

Next, the computing device of the automated testing tool (e.g., tool 108a) establishes a connection to the computing device of the browser-based software application (e.g., application 110a) associated with the tool-and-browser specific test execution. For example, the automated testing tool 108a determines that the specific test case is to be executed against the Chrome browser hosted by computing device 110a. The automated testing tool 108a connects to browser application 110a via network 104 and initializes the application 110a to prepare for execution of the tool-and-browser specific test execution. The automated testing tool 108a then executes the specific test case against the browser-based software application and transmits test results associated with the test case execution to the test result reporting module 106d of server computing device 106.

The test result reporting module 106d generates (208) an automation execution report based upon each of the plurality of tool-and-browser specific test executions. In one embodiment, the module 106d collects test results for each of the tool-and-browser specific test executions from the applicable automation testing tools 108 that executed the test cases against the browser-based software applications 110 to generate the automation execution report. The automation execution report identifies certain characteristics about the tool-and-browser specific test executions, including items such as: test case name, browser type, test status (e.g., completed, failed, etc.), test description, and the identification of any test errors that occurred during execution of the test cases. For example, the automation execution report can identify particular test steps for which an error was produced so that debugging efforts can advantageously focus on those steps. In one embodiment, the automation execution report is generated in an HTML format which captures all step-level information. For example, if any step failed during execution, the report shows which step failed with the reason for failure—which helps in debugging the test cases. FIG. 4 is an exemplary automation execution report as described herein. The report includes data elements such as test case name, the browser on which the test case was executed, the status of the test (i.e., Pass), a description of the test execution, a timestamp when the test was executed, and a link to a detailed report with additional metrics and metadata for the test.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated generation and execution of computer software test cases, the system comprising a server computing device that:
captures a digitized voice segment from a remote device, the first digitized voice segment corresponding to speech submitted by a user of the remote device;
generates a software automation test case using one or more phrases extracted from the digitized voice segment;
executes the software automation test case against a plurality of browser-based software applications using a plurality of automation testing tools, comprising:
selecting one or more of the automation testing tools to execute the software automation test case,
selecting one or more of the plurality of browser-based software applications against which to execute the software automation test case,
converting the software automation test case into a plurality of tool-and-browser specific test executions, each based upon test case requirements of a selected automation testing tool and test case requirements of a selected browser-based application, and
executing the plurality of tool-and-browser specific test executions; and
generates an automation execution report based upon each of the plurality of tool-and-browser specific test executions.

2. The system of claim 1, wherein the server computing device:
receives, from a client computing device, a text file comprising a manual test case;
imports one or more data elements from the text file into a database;
populates a set of test case pairs using the imported data elements; and
generates a software automation test case using the populated set of test case pairs.

3. The system of claim 1, wherein extracting one or more phrases from the digitized voice segment comprises converting one or more waveforms in the digitized voice segment into a corresponding number of text-based phrases.

4. The system of claim 3, wherein the server computing device aggregates the text-based phrases into a sequence of test actions and compiles the sequence of test actions to form the software automation test case.

5. The system of claim 1, wherein each of the automation testing tools is located on a separate computing device from the server computing device.

6. The system of claim 5, wherein each of the browser-based software application is located on a separate computing device from the server computing device.

7. The system of claim 6, wherein the step of executing the plurality of tool-and-browser specific test executions comprises, for each tool-and-browser specific test execution:
transmitting, by the server computing device, a tool-specific test case to the computing device of the automation testing tool associated with the tool-and-browser specific test execution;
establishing, by the computing device of the automation testing tool, a connection to the computing device of the browser-based software application associated with the tool-and-browser specific test execution;
executing, by the computing device of the automation testing tool, the tool-specific test case against the browser-based software application; and
transmitting, by the computing device of the automation testing tool, test results associated with the tool-and-browser specific test execution to the server computing device.

8. The system of claim 7, wherein the server computing device collects the test results for each of the tool-and-browser specific test executions to generate the automation execution report.

9. The system of claim 8, wherein the automation execution report identifies a test case name, a browser type, a test status, a test description, and one or more test errors for each executed tool-and-browser specific test execution.

10. The system of claim 9, wherein the automation execution report identifies one or more test steps in the tool-and-browser specific test execution that are associated with the one or more test errors.

11. The system of claim 1, wherein the step of converting the software automation test case into a plurality of tool-and-browser specific test executions comprises:
identifying test case requirements associated with each of the browser-based software applications;
identifying test case requirements associated with each of the automation testing tools; and
for each combination of an automation testing tool and a browser-based software application:
generating a tool-and-browser specific test execution based upon the software automation test case, the test case requirements associated with the automation testing tool, and the test case requirements associated with the browser-based software application.

12. The system of claim 11, wherein the step of generating a tool-and-browser specific test execution comprises extracting one or more data elements from the software automation test case and mapping each of the extracted data elements to a corresponding data element in a format recognizable by the automation testing tool based upon the test case requirements associated with the automation testing tool.

13. The system of claim 12, wherein the step of generating a tool-and-browser specific test execution comprises configuring one or more of the mapped data elements based upon the test case requirements associated with the browser-based software application.

14. The system of claim 1, wherein at least a portion of the plurality of browser-based applications comprises one or more different layouts for a single browser software platform.

15. A computerized method of automated generation and execution of computer software test cases, the method comprising:
capturing, by a server computing device, a digitized voice segment from a remote device, the first digitized voice segment corresponding to speech submitted by a user of the remote device;
generating, by the server computing device, a software automation test case using one or more phrases extracted from the digitized voice segment;
executing, by the server computing device, the software automation test case against a plurality of browser-based software applications using a plurality of automation testing tools, comprising:
selecting, by the server computing device, one or more of the automation testing tools to execute the software automation test case, selecting, by the server computing device, one or more of the plurality of browser-based software applications against which to execute the software automation test case, converting, by the server computing device, the software automation test case into a plurality of tool-and-browser specific test executions, each based upon test case requirements of a selected automation testing tool and test case requirements of a selected browser-based application, and executing, by the server computing device, the plurality of tool-and-browser specific test executions; and generating, by the server computing device, an automation execution report based upon each of the plurality of tool-and-browser specific test executions.

16. The method of claim 15, further comprising:
receiving, by the server computing device from a client computing device, a text file comprising a manual test case;
importing, by the server computing device, one or more data elements from the text file into a database;
populating, by the server computing device, a set of test case pairs using the imported data elements; and
generating, by the server computing device, a software automation test case using the populated set of test case pairs.

17. The method of claim 15, wherein extracting one or more phrases from the digitized voice segment comprises converting one or more waveforms in the digitized voice segment into a corresponding number of text-based phrases.

18. The method of claim 17, further comprising aggregating the text-based phrases into a sequence of test actions and compiling the sequence of test actions to form the software automation test case.

19. The method of claim 15, wherein each of the automation testing tools is located on a separate computing device from the server computing device.

20. The method of claim 19, wherein each of the browser-based software application is located on a separate computing device from the server computing device.

21. The method of claim 20, wherein the step of executing the plurality of tool-and-browser specific test executions comprises, for each tool-and-browser specific test execution:
transmitting, by the server computing device, a tool-specific test case to the computing device of the automation testing tool associated with the tool-and-browser specific test execution;
establishing, by the computing device of the automation testing tool, a connection to the computing device of the browser-based software application associated with the tool-and-browser specific test execution;
executing, by the computing device of the automation testing tool, the tool-specific test case against the browser-based software application; and
transmitting, by the computing device of the automation testing tool, test results associated with the tool-and-browser specific test execution to the server computing device.

22. The method of claim 21, further comprising collecting, by the server computing device, the test results for each of the tool-and-browser specific test executions to generate the automation execution report.

23. The method of claim 22, wherein the automation execution report identifies a test case name, a browser type, a test status, a test description, and one or more test errors for each executed tool-and-browser specific test execution.

24. The method of claim 23, wherein the automation execution report identifies one or more test steps in the tool-and-browser specific test execution that are associated with the one or more test errors.

25. The method of claim 15, wherein the step of converting the software automation test case into a plurality of tool-and-browser specific test executions comprises:
identifying, by the server computing device, test case requirements associated with each of the browser-based software applications;
identifying, by the server computing device, test case requirements associated with each of the automation testing tools; and
for each combination of an automation testing tool and a browser-based software application:
generating, by the server computing device, a tool-and-browser specific test execution based upon the software automation test case, the test case requirements associated with the automation testing tool, and the test case requirements associated with the browser-based software application.

26. The method of claim 25, wherein the step of generating a tool-and-browser specific test execution comprises extracting one or more data elements from the software automation test case and mapping each of the extracted data elements to a corresponding data element in a format recognizable by the automation testing tool based upon the test case requirements associated with the automation testing tool.

27. The method of claim 26, wherein the step of generating a tool-and-browser specific test execution comprises configuring one or more of the mapped data elements based upon the test case requirements associated with the browser-based software application.

28. The method of claim 15, wherein at least a portion of the plurality of browser-based applications comprises one or more different layouts for a single browser software platform.

29. A computer program product, tangibly embodied in a non-transitory computer readable storage device, for automated generation and execution of computer software test cases, the computer program product including instructions that, when executed, cause a server computing device to:
capture a digitized voice segment from a remote device, the first digitized voice segment corresponding to speech submitted by a user of the remote device;
generate a software automation test case using one or more phrases extracted from the digitized voice segment;
execute the software automation test case against a plurality of browser-based software applications using a plurality of automation testing tools, comprising:
selecting one or more of the automation testing tools to execute the software automation test case,
selecting one or more of the plurality of browser-based software applications against which to execute the software automation test case,
converting the software automation test case into a plurality of tool-and-browser specific test executions, each based upon test case requirements of a selected automation testing tool and test case requirements of a selected browser-based application, and
executing the plurality of tool-and-browser specific test executions; and generate an automation execution report based upon each of the plurality of tool-and-browser specific test executions.

\* \* \* \* \*